United States Patent
Guo

(10) Patent No.: US 12,457,925 B2
(45) Date of Patent: Nov. 4, 2025

(54) METHOD FOR CALIBRATING LAWNMOWER

(71) Applicant: Willand (Beijing) Technology Co., LTD., Beijing (CN)

(72) Inventor: Ziwei Guo, Beijing (CN)

(73) Assignee: Willand (Beijing) Technology Co., LTD. (CN)

( * ) Notice: Subject to any disclaimer, the term of this patent is extended or adjusted under 35 U.S.C. 154(b) by 279 days.

(21) Appl. No.: 18/153,384

(22) Filed: Jan. 12, 2023

(65) Prior Publication Data
US 2023/0217855 A1   Jul. 13, 2023

(30) Foreign Application Priority Data

Jan. 12, 2022  (CN) .......................... 202210033634.1
Dec. 27, 2022  (CN) .......................... 202211681096.3

(51) Int. Cl.
A01D 34/00   (2006.01)

(52) U.S. Cl.
CPC .................................. A01D 34/008 (2013.01)

(58) Field of Classification Search
CPC ..................................................... A01D 34/008
See application file for complete search history.

(56) References Cited

U.S. PATENT DOCUMENTS

| | | | | | |
|---|---|---|---|---|---|
| 5,204,814 | A | * | 4/1993 | Noonan | B60L 15/2036 701/25 |
| 2017/0303466 | A1 | * | 10/2017 | Grufman | G06T 7/80 |
| 2019/0208699 | A1 | * | 7/2019 | Hasegawa | G01S 7/4802 |
| 2019/0241282 | A1 | | 8/2019 | Strobel | |
| 2019/0375099 | A1 | | 12/2019 | Xiong et al. | |
| 2021/0176915 | A1 | | 6/2021 | Vines et al. | |
| 2022/0369545 | A1 | * | 11/2022 | Kaufman | G01D 21/00 |

FOREIGN PATENT DOCUMENTS

| | | |
|---|---|---|
| CN | 106325287 A | 1/2017 |
| CN | 107258207 A | 10/2017 |
| CN | 108226859 A | 6/2018 |
| CN | 110764499 A | 2/2020 |
| CN | 110793524 A | 2/2020 |
| CN | 112438112 A | 3/2021 |
| CN | 113207412 A | 8/2021 |
| CN | 113459088 A | 10/2021 |
| DE | 1784512 A1 | 5/1975 |
| WO | 2021238923 A1 | 12/2021 |

OTHER PUBLICATIONS

Author: Luciano Floridi, and translated by Wen-Ge Wang, «Fourth Revolution», Publisher: Zhejiang People's Publishing House, Edition: 1st edition, May 2016, p. 159.

* cited by examiner

*Primary Examiner* — Gertrude Arthur Jeanglaude
(74) *Attorney, Agent, or Firm* — Emerson, Thomson, & Bennett, LLC; Roger D. Emerson; Matt J. Wilson

(57) ABSTRACT

Embodiments of the present disclosure provide a method for calibrating a lawnmower, including: collecting a preset number of position data of the lawnmower moving relative to a charging station; performing straight line fitting using the preset number of position data; and determining, if the preset number of position data fits a straight line, an orientation of the charging station based on a slope of the fitted straight line. Accordingly, embodiments of the present disclosure may accurately determine the orientation of the charging station and has the advantages of high calibration accuracy and low calibration cost.

19 Claims, 10 Drawing Sheets

| determining, during moving of a lawnmower relative to a charging station, an orientation of the charging station, based on a plurality of position data and pose data of the lawnmower | ⟵ S302 |
|---|---|

| Sending first indication information for indicating successful determination, if the orientation of the charging station is determined | ⟵ S304 |
|---|---|

METHOD FOR CALIBRATING LAWNMOWER

CROSS-REFERENCE TO RELATED APPLICATIONS

The present disclosure claims priority to Chinese Application No. 202210033634.1 filed on Jan. 12, 2022, entitled "Method and Apparatus for Calibrating Lawnmower, Electronic Device, Storage Medium and Lawnmower", and Chinese Application No. 202211681096.3 filed on Dec. 27, 2022, entitled "Method and Apparatus for Calibrating Lawnmower, Electronic Device, Storage Medium and Lawnmower", all of which are incorporated herein by reference in their entireties.

TECHNICAL FIELD

The present disclosure relates to the technical field of lawnmowers, in particular to a method for calibrating a lawnmower.

BACKGROUND

The existing method for determining an orientation of a charging station of a lawnmower in the local Cartesian coordinate system (also known as the ENU coordinate system) usually includes two methods. The first method is to use a geomagnetic sensor to measure a direction of the magnetic field, and calculate a magnetic declination by obtaining the latitude and longitude to obtain orientation information of the charging station of the lawnmower in the ENU coordinate system; and the second method is to obtain orientation information of the charging station of the lawnmower by installing dual RTK antennas.

However, in the first method, the geomagnetic sensor may be easily disturbed by a surrounding magnetic field, resulting in inaccurate measurement results and large errors in travel direction, and the method relies on GPS to obtain the latitude, longitude and altitude of the lawnmower to calculate the magnetic declination, which is very complicated and costly; in the second method, costs of the dual RTK antennas are relatively high, and there are also high requirements for antenna installation accuracy, which leads to the problem of difficult antenna installation.

In view of this, there is an urgent need for a method for determining an orientation of a charging station of a lawnmower that can reduce a measurement cost and improve a measurement accuracy.

SUMMARY

In view of this, an embodiment of the present disclosure provides a lawnmower calibration scheme having higher accuracy and lower cost, so as to at least partly solve the above problems.

According to an aspect of embodiments of the present disclosure, a method for calibrating a lawnmower is provided, including: collecting a preset number of position data during moving of the lawnmower relative to a charging station; performing straight line fitting using the preset number of the position data; and determining, if the preset number of the position data fits a straight line, an orientation of the charging station based on a slope of the fitted straight line.

According to another aspect of embodiments of the present disclosure, another method for calibrating a lawnmower is provided, including: determining, during moving of a lawnmower relative to a charging station, an orientation of the charging station, based on a plurality of position data and pose data of the lawnmower; and sending first indication information for indicating successful determination, if the orientation of the charging station is determined.

According to another aspect of embodiments of the present disclosure, another method for calibrating a lawnmower is provided, including: displaying a calibration option in a display interface, and sending a calibration trigger instruction to the lawnmower when the calibration option is triggered; and displaying, if first indication information is received from the lawnmower in response to the calibration trigger instruction, calibration success prompt information in the display interface, wherein the first indication information is determined based on a successfully determined orientation of a charging station, and the orientation of the charging station is determined based on a plurality of position data and pose data during moving of the lawnmower relative to the charging station.

According to another aspect of embodiments of the present disclosure, an apparatus for calibrating a lawnmower is provided, including: a collection module, configured to collect a preset number of position data during moving of the lawnmower relative to a charging station; a fitting module, configured to perform straight line fitting using the preset number of the position data; and a determination module, configured to determine, if the preset number of the position data fits a straight line, an orientation of the charging station based on a slope of the fitted straight line.

According to another aspect of embodiments of the present disclosure, a lawnmower is provided, including a controller, and the controller is configured to: collect a preset number of position data during moving of the lawnmower relative to a charging station; perform straight line fitting using the preset number of the position data; and determine, if the preset number of the position data fits a straight line, an orientation of the charging station based on a slope of the fitted straight line.

According to another aspect of embodiments of the present disclosure, an electronic device is provided, including: a processor; and a memory, for storing a program; wherein, the program includes instructions, the instructions, when executed by the processor, cause the processor to perform the method for calibrating a lawnmower described in the above aspect.

According to another aspect of embodiments of the present disclosure, a non-transitory computer readable storage medium is providing, storing computer instructions thereon, wherein, the computer instructions are used to cause the computer to perform the method described in the above aspect.

The scheme for calibrating a lawnmower provided in the embodiments of the present disclosure, determines the orientation of the charging station by collecting measurement data during the movement of the lawnmower relative to the charging station and performing straight line fitting based on the measurement data. Accordingly, embodiments of the present disclosure may accurately determine the orientation of the charging station and has the advantages of high calibration accuracy and low calibration cost.

BRIEF DESCRIPTION OF THE DRAWINGS

Further details, features and advantages of the present disclosure are disclosed in the following description of exemplary embodiments with reference to the accompanying drawings, in which.

DETAILED DESCRIPTION OF EMBODIMENTS

Figure 1:
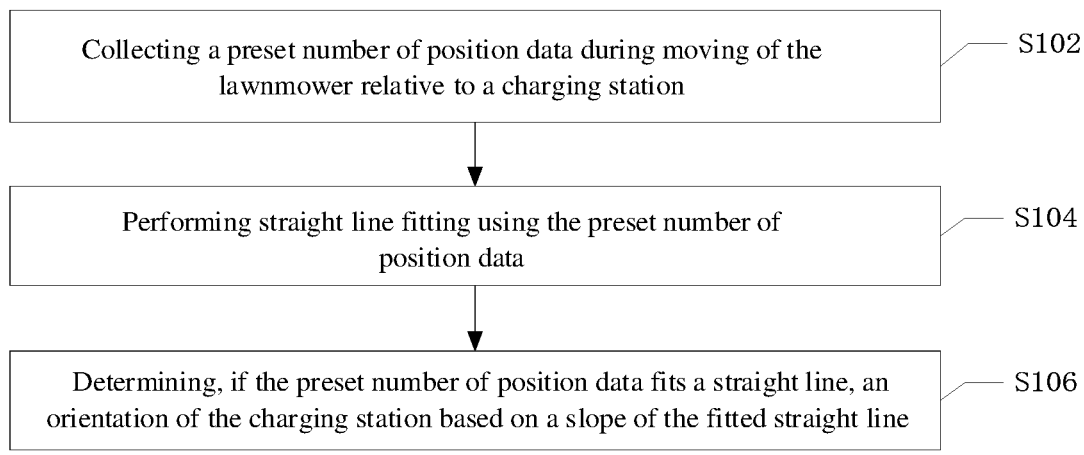
FIG. 1 is a schematic flowchart of a method for calibrating a lawnmower according to an exemplary embodiment of the present disclosure.

Embodiments of the present disclosure will be described in more detail below with reference to the accompanying drawings. Although certain embodiments of the present disclosure are shown in the drawings, it should be understood that embodiments of the present disclosure may be embodied in various forms and should not be construed as limited to the embodiments set forth herein. Instead, these embodiments are provided so that the understanding of embodiments of the present disclosure will be thorough and complete. It should be understood that the accompanying drawings and embodiments of the present disclosure are for exemplary purposes only, and are not intended to limit the protection scope of embodiments of the present disclosure.

It should be understood that the individual steps described in the method embodiments of the present disclosure may be performed in a different order, and/or in parallel. In addition, the method embodiments may include additional steps and/or omit performing the steps illustrated. The scope of embodiments of the present disclosure is not limited in this regard.

The term "includes" and variations thereof as used herein are open-ended, i.e., "includes but is not limited to". The term "based on" is "based, at least in part, on". The term "an embodiment" indicates "at least one embodiment"; the term "another embodiment" indicates "at least one additional embodiment"; the term "some embodiments" indicate "at least some embodiments". Definitions of other terms will be given in the description below. It should be noted that the concepts "first" and "second" mentioned in embodiments of the present disclosure are used only to distinguish between different apparatuses, modules or units, and are not intended to define the order or interdependence of functions performed by these apparatuses, modules or units.

It should be noted that the modifications of "one" and "more than one" mentioned in embodiments of the present disclosure are schematic and not restrictive, and it should be understood by those skilled in the art that they should be understood as "one or more" unless the context clearly indicates otherwise. The names of messages or information interacted between the plurality of apparatuses in the present disclosure are used for illustrative purposes only and are not intended to limit the scope of those messages or information.

Presented as described in the background section, the current method for determining an orientation of a charging station of a lawnmower in the local Cartesian coordinate system has problems of inaccurate measurement accuracy and high cost of measurement configuration (RTK antenna cost), in view of this, embodiments of the present disclosure provides a scheme for calibrating a lawnmower that can accurately determine an orientation of a charging station of a lawnmower, to improve the various problems in the prior art.

In some examples, the method may be applied when a lawnmower is first started, such as when a user purchases a lawnmower and activates it for the first time. Using this method, an orientation of a charging station of the lawnmower may be calibrated (it should be noted that the orientation calibration described in embodiments of the present disclosure may be understood as detecting or determining the orientation), after the calibration, the lawnmower may be controlled to start mapping, then, based on a map built, the lawnmower mows grass automatically. Of course, in other embodiments, the method may be applied to other scenarios where the orientation of the charging station needs to be determined or calibrated, and is not limited to the scenarios exemplified in this embodiment. Each embodiment of the present disclosure will be described in detail below in conjunction with each of the accompanying drawings.

FIG. 1 illustrates a processing flow according to an exemplary embodiment of the present disclosure. As shown in the figure, this embodiment mainly includes the following steps:

Step S102, collecting a preset number of position data during moving of the lawnmower relative to a charging station.

Alternatively, the lawnmower may be driven to move in a direction along a straight line away from the charging station in a pose corresponding to an initialized position, and the preset number of position data of the lawnmower during the movement may be collected.

Alternatively, a rotation angle of a pose of the lawnmower at each position where the position data is collected relative to a pose of the lawnmower corresponding to the initialized position is less than an angle threshold.

Figure 3A:
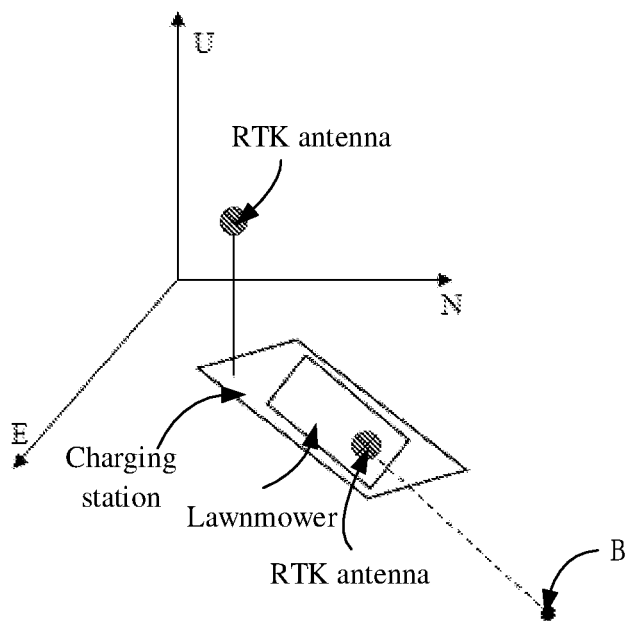
FIGS. 3A to 3C are schematic diagrams of an exemplary application of the method for calibrating a lawnmower of embodiments of the present disclosure.
Figure 3B:
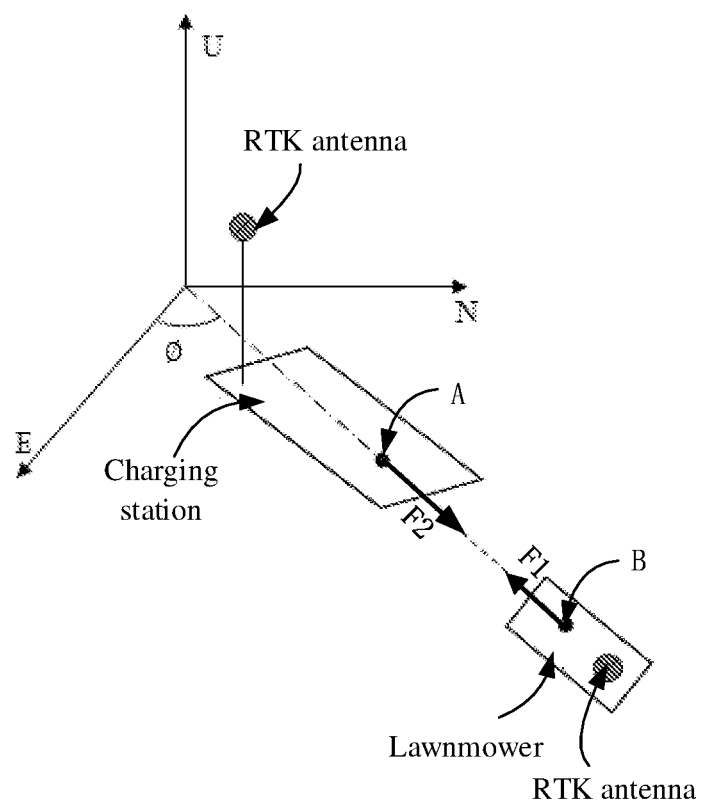
Figures 3C, 3D:
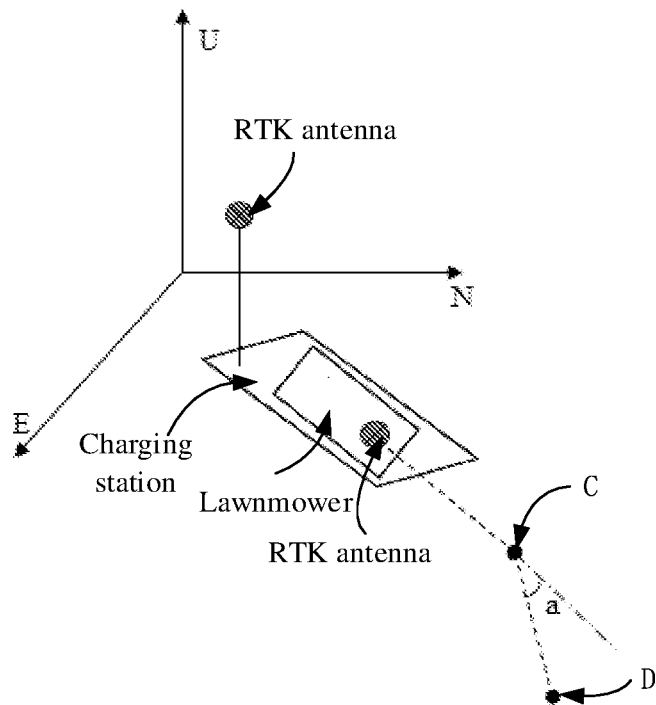
FIG. 3D is a schematic flowchart of steps of a method for calibrating a lawnmower of embodiments of the present disclosure.

In this embodiment, a pair of RTK antennas respectively set at a preset position and on the lawnmower may be used to acquire the preset number of position data (also known as RTK measurement points) of the lawnmower in the local Cartesian coordinate system (or ENU coordinate system). For example, as shown in FIGS. 3A to 3C, a pair of RTK antennas respectively set on the charging station and the lawnmower may be used to acquire each position data of the lawnmower.

Step S104, performing straight line fitting using the preset number of position data.

Alternatively, the preset number may be set to 26, i.e., when the collected position data of the lawnmower reaches 26, straight line fitting is performed.

It should be noted that the above preset number may be adjusted arbitrarily according to actual needs, the embodiment of the present disclosure does not limit in this regard.

Step S106, determining, if the preset number of position data fits a straight line, an orientation of the charging station based on a slope of the fitted straight line.

In this embodiment, when a straight line is successfully fitted based on the preset number of position data, the orientation of the charging station (also known as pose of the charging station) may be determined based on the slope of the fitted straight line.

In this embodiment, the orientation of the charging station is an outlet orientation of the charging station, that is, orientation of a charging tongue on the charging station. The lawnmower may return to the charging station and establish an electrical connection with it to perform a charging operation of the lawnmower based on the determined orientation of the charging station.

To sum up, the method for calibrating a lawnmower in this embodiment, by collecting the preset number of measurement data during the movement of the lawnmower relative to the charging station, to perform straight line fitting, determines the orientation of the charging station based on the fitted straight line. Therefore, this embodiment may accurately determine the orientation of the charging station and has the advantages of simple calibration operation and low calibration cost.

Figure 2:
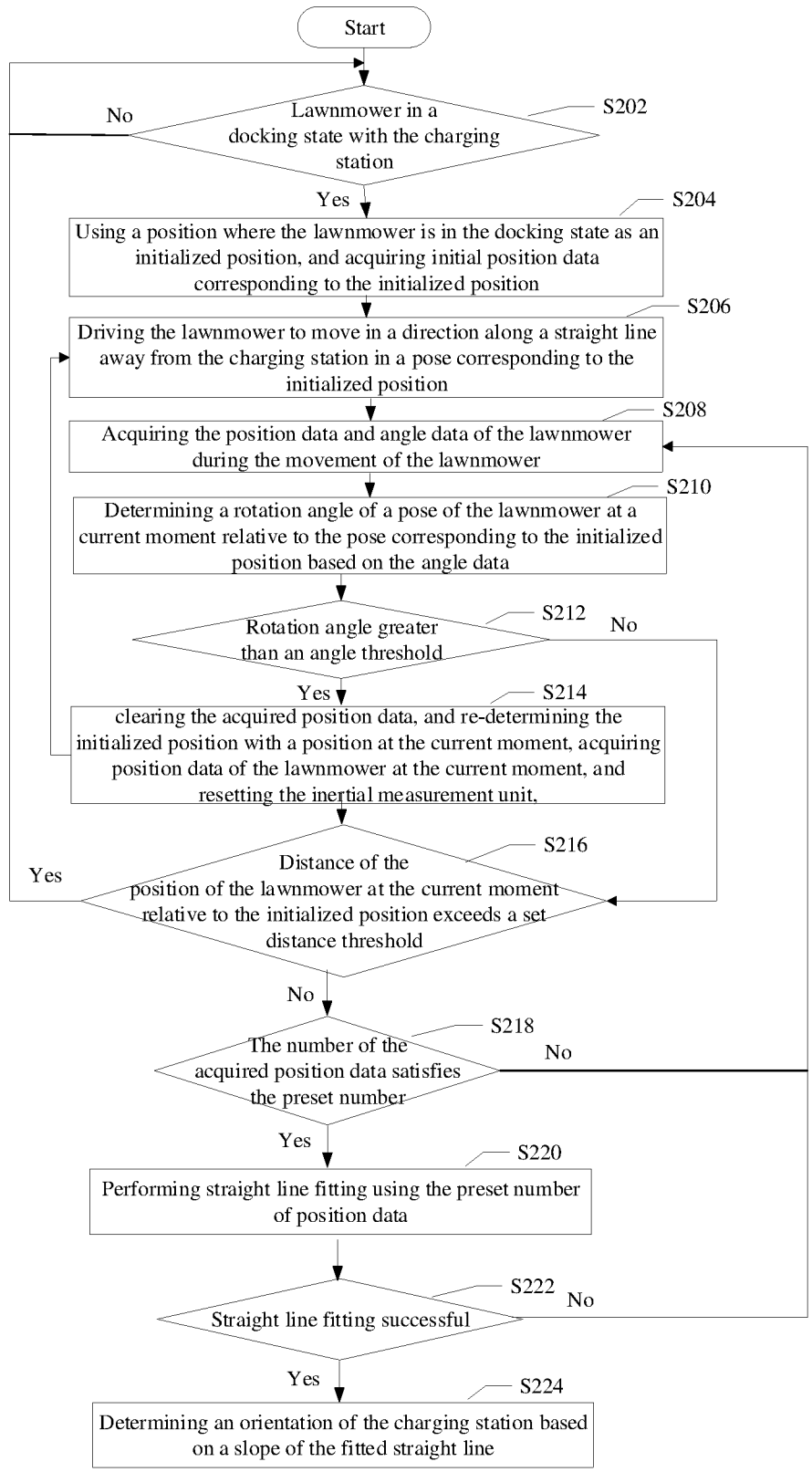
FIG. 2 is a schematic flowchart of the method for calibrating a lawnmower according to another exemplary embodiment of the present disclosure.

FIG. 2 illustrates a processing flow of the method for calibrating a lawnmower according to another exemplary embodiment of the present disclosure. As shown in the figure, this embodiment mainly includes the following steps:

Step S202, determining whether the lawnmower is in a docking state with the charging station, if yes, proceeding to step S204, otherwise repeat performing this step.

Alternatively, it is possible to determine whether the lawnmower is in the docking state with the charging station by determining whether the lawnmower is in charging state.

Step S204, using a position where the lawnmower is in the docking state as an initialized position, and acquiring initial position data corresponding to the initialized position.

In this embodiment, the preset number of position data includes the initial position data.

Step S206, driving the lawnmower to move in a direction along a straight line away from the charging station in a pose corresponding to the initialized position.

Alternatively, the lawnmower may be driven to move backward in a straight line relative to the charging station in the pose corresponding to the initialized position.

Step S208, acquiring the position data and angle data of the lawnmower during the movement of the lawnmower.

Alternatively, a pair of RTK antennas respectively set on the charging station and the lawnmower may be used to acquire each position data of the lawnmower.

In this embodiment, a sampling frequency of 10 Hz may be used to collect each moving position of the lawnmower.

Alternatively, the angle data of the lawnmower may be acquired using an inertial measurement unit provided on the lawnmower.

Step S210, determining a rotation angle of a pose of the lawnmower at a current moment relative to the pose corresponding to the initialized position based on the angle data.

The rotation angle (e.g., rotation angle a shown in FIG. 3C) of the pose of the lawnmower at the current moment relative to the pose corresponding to the initialized position may be determined based on the angle data.

Step S212, determining whether the rotation angle is greater than a set angle threshold, if yes, proceeding to step S214, otherwise continue performing step S216.

In this embodiment, the set angle threshold may be set to 20°, but is not limited thereto, and may be adjusted arbitrarily according to actual calibration needs, which is not limited in the embodiment of the present disclosure.

Step S214, clearing the acquired position data, and re-determining the initialized position with a position at the current moment, acquiring position data of the lawnmower at the current moment, and resetting the inertial measurement unit, and returning to step S206 to continue execution.

For example, referring to FIG. 3C, when it is determined that the rotation angle of the lawnmower at a point C position exceeds the set angle threshold, all the currently collected position data is cleared, and the position at the current moment of the lawnmower is updated as the initialized position of the lawnmower (e.g., the initialized position of the lawnmower is updated from an original point A position shown in FIG. 3A to the point C position shown in FIG. 3C), and a measurement value of the inertial measurement unit is reset to 0, and return to step S206 to continue execution.

Step S216, determining whether a distance of the position of the lawnmower at the current moment relative to the initialized position exceeds a set distance threshold, if not exceeded, performing step S218, if exceeded, returning to step S202 to continue execution.

Alternatively, the distance of the position of the lawnmower at the current moment relative to the initialized position may be determined using an encoder provided on the lawnmower.

Alternatively, the encoder may include a magnetic encoder.

Alternatively, the set distance threshold may be set to 2 m, but is not limited thereto, and may be adjusted arbitrarily according to actual calibration needs.

In this embodiment, if the distance of the position of the lawnmower at the current moment relative to the initialized position exceeds the distance threshold, it may be determined that calibration fails, and the lawnmower is driven to move to the charging station to wait for a next calibration.

Step S218, determining whether the number of the acquired position data satisfies the preset number, if yes, proceeding to step S220, if not, returning to step S208 to continue execution.

For example, when it is determined that the number of the acquired position data reaches 26, proceeding to step S220.

Step S220, performing straight line fitting using the preset number of position data.

For example, performing straight line fitting using at least 26 position data.

Step S222, determining whether the straight line fitting is successful, if yes, proceeding to step S224, if not, returning to step S208 to continue execution.

Step S224, determining an orientation of the charging station based on a slope of the fitted straight line.

Alternatively, a travel direction of the lawnmower may be determined based on the slope of the fitted straight line, the rotation angle of the pose of the lawnmower at the current moment relative to the pose corresponding to the initialized position may be determined based on the angle data of the inertial measurement unit, then the orientation of the charging station may be determined based on the rotation angle and the travel direction of the lawnmower.

For example, in the embodiment shown in FIG. 3B, the outlet orientation of the charging station (as shown in FIG. 3B in a direction of F2 arrow) may be determined based on the travel direction of the lawnmower (as shown in FIG. 3B in a direction of F1 arrow) and the rotation angle of the lawnmower.

It should be noted that in the example shown in FIG. 3B, since the lawnmower moves in a relative standard straight-line trajectory relative to the charging station, the rotation angle of the lawnmower tends to 0°, the outlet orientation of the charging station is the opposite direction of the travel direction of the lawnmower.

To sum up, the method for calibrating a lawnmower in this embodiment of the present disclosure, determines the initialized position of the lawnmower by determining the state of the lawnmower docking with the charging station, and performs calibration operation of the lawnmower by collecting the preset number of position data during the movement of the lawnmower along a straight line in a direction away from the charging station in the pose corresponding to the initialized position and performing straight line fitting, which has the advantages of simple calibration operation and no human intervention, and may reduce the problem that the accuracy of calibration results is affected by operational errors during human intervention.

In addition, in this embodiment of the present disclosure, during the movement of the lawnmower relative to the charging station, by determining whether the rotation angle of the pose of the lawnmower at each position where the position data is collected relative to the pose of the lawnmower corresponding to the initialized position is less than the angle threshold, when it is determined that the rotation angle of the pose of the lawnmower corresponding to a moving position relative to the pose of the lawnmower corresponding to the initialized position exceeds the angle threshold, it represents that a fold point occurs in the straight-line movement of the lawnmower relative to the charging station, by resetting the currently collected position data and angle data of the lawnmower and updating this fold point position as the initialized position of the lawnmower to re-execute the calibration operation of the lawnmower based on the updated initialized position, the accuracy of calibration results of the lawnmower may be ensured.

In addition, in this embodiment of the present disclosure, by setting the distance threshold, and during calibration, when it is judged that the distance of the position of the lawnmower at the current moment relative to the initialized position exceeds the distance threshold, it may be determined that the calibration fails and the lawnmower is driven back to the position of the charging station to wait for a next round of calibration. By setting a criterion for judging that the lawnmower calibration fails, it may avoid performing invalid lawnmower calibration operations, so as to improve a calibration handling efficiency of the lawnmower.

In addition, this embodiment only needs to configure a single RTK antenna, the inertial measurement unit and the encoder to accurately determine the orientation of the charging station, and requires fewer types of sensors, which may effectively reduce a calculation cost of the orientation of the charging station.

In addition to the implementation process exemplified above, according to another aspect of an embodiment of the present disclosure, a method for calibrating a lawnmower is provided, as shown in FIG. 3D, the method includes the following steps:

Step S302: determining, during moving of a lawnmower relative to a charging station, an orientation of the charging station, based on a plurality of position data and pose data of the lawnmower.

In some examples, one of a pair of RTK antennas is mounted on the lawnmower, the other of the pair of RTK antennas is mounted on the charging station, in addition, the lawnmower is also equipped with an inertial measurement unit and an encoder. In an initial state, the lawnmower is docked with the charging station, and the lawnmower may withdraw from the charging station in its current pose. During the withdrawal, the position data of the lawnmower may be detected through a pair of RTK antennas, and the pose data of the lawnmower may be detected through the inertial measurement unit. Based on the collected position data and pose data, the orientation of the charging station may be determined.

Figure 3E:
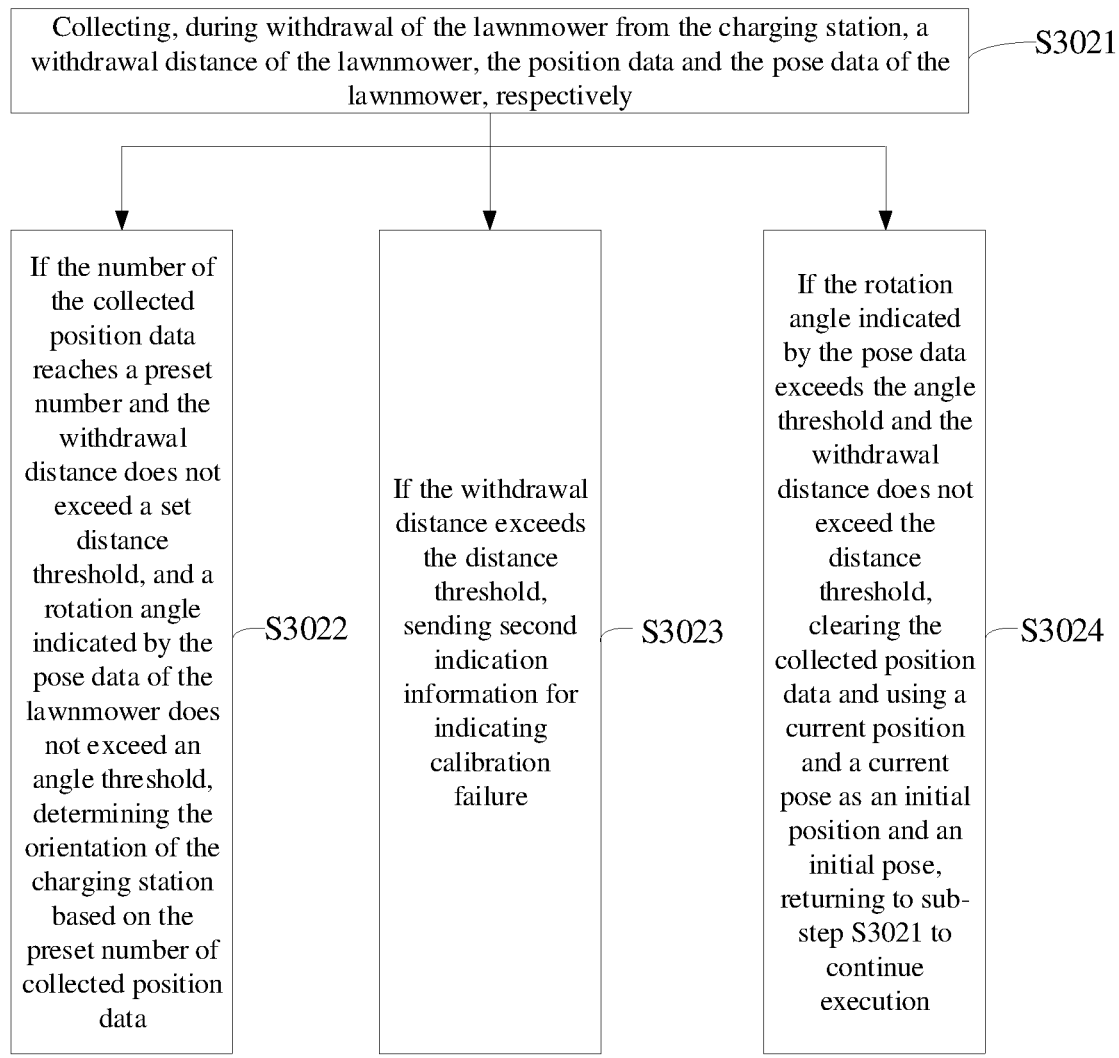
FIG. 3E is a schematic flowchart of sub-steps of step S302.

For example, as shown in FIG. 3E, step S302 may be implemented through the following sub-steps:

Sub-step S3021: collecting, during withdrawal of the lawnmower from the charging station, a withdrawal distance of the lawnmower, the position data and the pose data of the lawnmower, respectively.

As described above, when the lawnmower withdraws from the charging station, the position data of the lawnmower is collected through the RTK antennas, and the pose data of the lawnmower is detected through the inertial measurement unit. The pose data may indicate an angle by which the lawnmower is deflected from an initial pose. In addition, the withdrawal distance of the lawnmower relative to the charging station (that is, an initial position) may be collected through the encoder on the lawnmower.

Safety of the lawnmower may be ensured by detecting the withdrawal distance, avoiding danger caused by short safety distance near the charging station and long moving distance of the lawnmower during the calibration. The withdrawal distance of the lawnmower is detected to avoid excessive withdrawal distance of the lawnmower. If the currently detected withdrawal distance of the lawnmower exceeds the set distance threshold, it indicates that there is danger, and sub-step S3023 may be performed.

In order to ensure the accuracy of calibration, a rotation angle of a pose of the lawnmower relative to the initial position may be determined based on the pose data of the lawnmower. If the rotation angle is greater than an angle threshold, it indicates that a backward trajectory of the lawnmower relative to the charging station is no longer a straight line, but may form a broken-line trajectory similar to that shown in FIG. 3C, which makes it difficult to ensure that the determined orientation of the charging station is accurate, therefore, in this case, sub-step S3024 may be performed.

If it is determined based on the pose data that the rotation angle does not exceed the angle threshold, it indicates that this calibration may continue to be performed, and when the number of the collected position data reaches a preset number, sub-step S3022 may be performed.

Sub-step S3022: if the number of the collected position data reaches a preset number and the withdrawal distance does not exceed a set distance threshold, and a rotation angle indicated by the pose data of the lawnmower does not exceed an angle threshold, determining the orientation of the charging station based on the preset number of collected position data.

When the number of the collected position data reaches the preset number, it indicates that there is relatively sufficient position data to ensure that the orientation of the charging station may be accurately determined. In this case, the orientation of the charging station may be determined by performing straight line fitting using the preset number of position data. If a straight line is fitted, the orientation of the charging station may be determined based on the fitted straight line. Since the rotation angle indicated by the pose data exceeds the angle threshold, a direction of the fitted straight line may be used as the orientation of the charging station.

If a straight line cannot be fitted, it may be determined that the calibration fails, and a restart is indicated, or other set actions are indicated to be performed.

Sub-step S3023: if the withdrawal distance exceeds the distance threshold, sending second indication information for indicating calibration failure.

It should be noted that this step is optional. When the withdrawal distance of the lawnmower exceeds the distance threshold (such as 2 m), it indicates that it may be dangerous to continue the calibration, so the calibration may be terminated, and the second indication information indicating the calibration failure is sent to facilitate a user to learn the calibration failure information. For example, the second indication information may be sent to a display device (such as the user's mobile phone) communicatively connected with the lawnmower, but is not limited thereto.

Sub-step S3024: if the rotation angle indicated by the pose data exceeds the angle threshold and the withdrawal distance does not exceed the distance threshold, clearing the collected position data and using a current position and a current pose as an initial position and an initial pose, returning to sub-step S3021 to continue execution.

When it is determined based on the pose data that the rotation angle of the lawnmower exceeds the angle threshold (such as 20°), and the withdrawal distance of the lawnmower does not exceed the distance threshold, it indicates that there is still a relatively safe space for calibration. In this regard, the collected position data may be cleared, calibration may be re-started from the current position as the initial position, and the current pose as the initial pose, so that the orientation of the charging station can be determined.

Step S304: sending first indication information for indicating successful determination, if the orientation of the charging station is determined.

For the convenience of the user, after the orientation of the charging station is determined, the first indication information may be sent to a device connected to the lawnmower to indicate that the determination of the orientation of the charging station is successful. The device may be a mobile phone, etc. that communicates with the lawnmower, but is not limited thereto.

Using the method in this embodiment, only a pair of RTK antennas need to be mounted on the lawnmower and the charging station, and combined with the inertial measurement unit and the encoder carried on the lawnmower, accurate determination of the orientation of the charging station may be realized, which not only reduces the cost, but also improves the accuracy, and avoids the problem of inaccurate determination caused by interference from other magnetic fields. After the orientation of the charging station is determined, the first indication information may be actively sent to facilitate the user to learn that the determination of the orientation of the charging station is completed, which improves user perception, so that the user can learn actions of the lawnmower more intuitively and quickly.

Figure 3F:
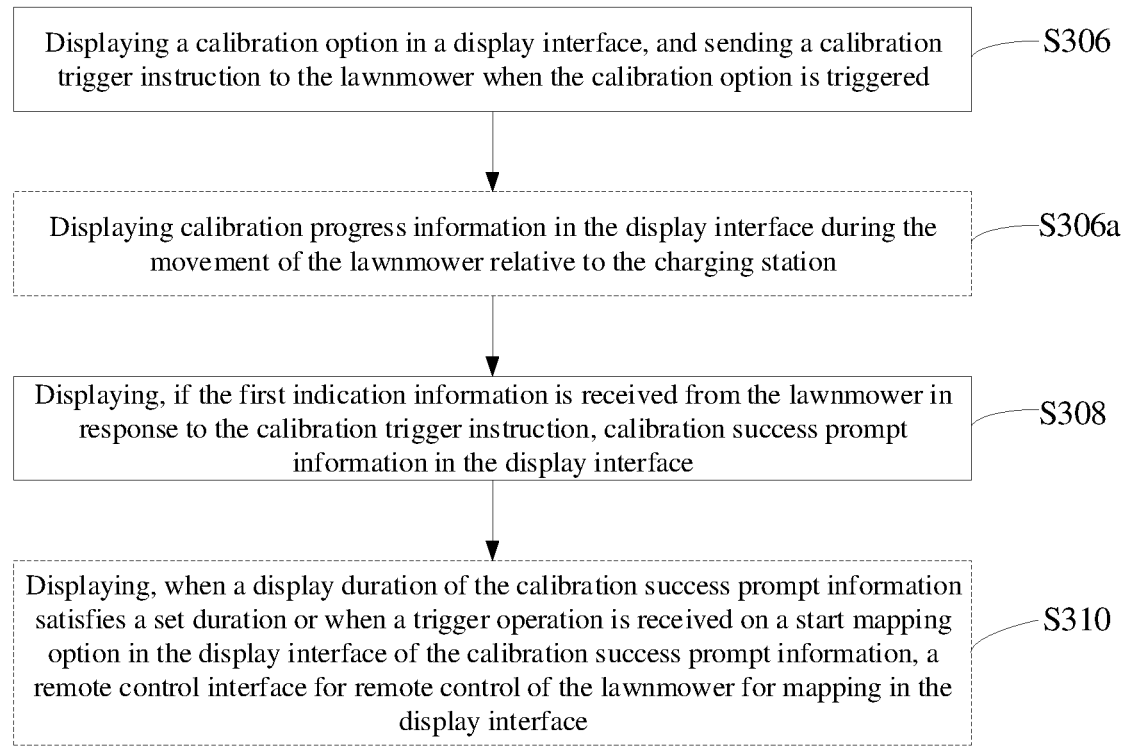
FIG. 3F is a schematic flowchart of steps of another method for calibrating a lawnmower of embodiments of the present disclosure.

According to another aspect of embodiments of the present disclosure, a method for calibrating a lawnmower is provided, as shown in FIG. 3F, the method includes the following steps:

Step S306: displaying a calibration option in a display interface, and sending a calibration trigger instruction to the lawnmower when the calibration option is triggered.

The display interface may be displayed by a device such as a mobile phone, and the calibration option on the display interface may be a button or other options that can interact with the user. Using the button as an example, when the user clicks on the calibration option, the calibration trigger instruction is sent to the lawnmower, so that the lawnmower automatically starts to calibrate an orientation of a charging station. The calibration process may be implemented by using the aforementioned method. If the lawnmower successfully calibrates the orientation of the charging station, it sends first indication information to the mobile phone, and the first indication information indicates that the orientation of the charging station is successfully calibrated. In this embodiment, the first indication information is determined based on the successfully determined orientation of the charging station, and the orientation of the charging station is determined based on a plurality of position data and pose data during moving of the lawnmower relative to the charging station.

Step S308: displaying, if the first indication information is received from the lawnmower in response to the calibration trigger instruction, calibration success prompt information in the display interface.

Figure 3G:
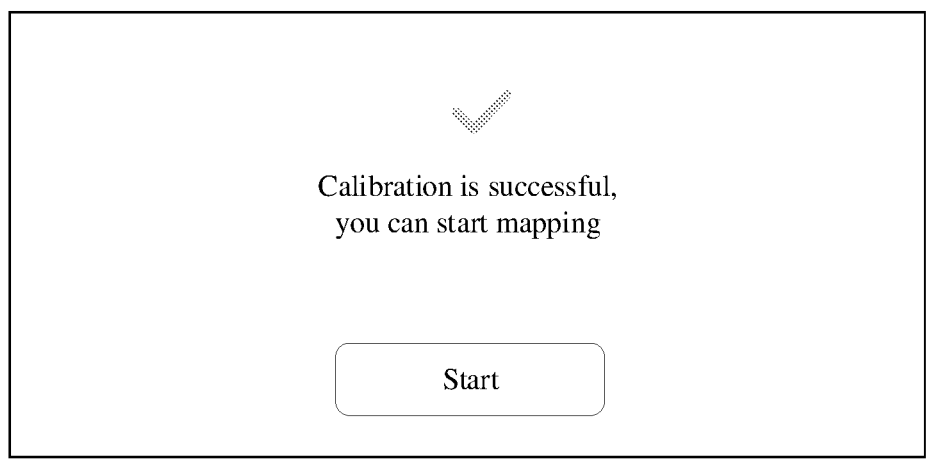
FIG. 3G is a schematic diagram of a display screen of calibration success prompt information.

As shown in FIG. 3G, by displaying the calibration success prompt information in the display interface, it is convenient for the user to quickly learn a calibration result.

Alternatively, in order to improve the intelligence of interaction, the method further includes:

Step S310: displaying, when a display duration of the calibration success prompt information satisfies a set duration or when a trigger operation is received on a start mapping option in the display interface of the calibration success prompt information, a remote control interface for remote control of the lawnmower for mapping in the display interface.

In view of the situation that the display satisfies the set duration (such as 2 seconds or 3 seconds), typically, the lawnmower may automatically build a map after the orientation calibration of the charging station is completed. Therefore, after the calibration success prompt information is displayed for a period of time (such as 2 seconds or 3 seconds), the remote control interface for remote control of the lawnmower for mapping may be automatically displayed in the display interface, allowing the user to control the lawnmower for mapping through the mobile phone.

Alternatively, in the process of displaying the calibration success prompt information, if the trigger operation from the user is received, the remote control interface for remote control of the lawnmower for mapping may be displayed in the display interface.

Alternatively, during automatic calibration of the lawnmower, in order to facilitate the user to better understand a calibration progress, the method further includes:

Step S306a: displaying calibration progress information in the display interface during the movement of the lawnmower relative to the charging station.

Figure 3H:
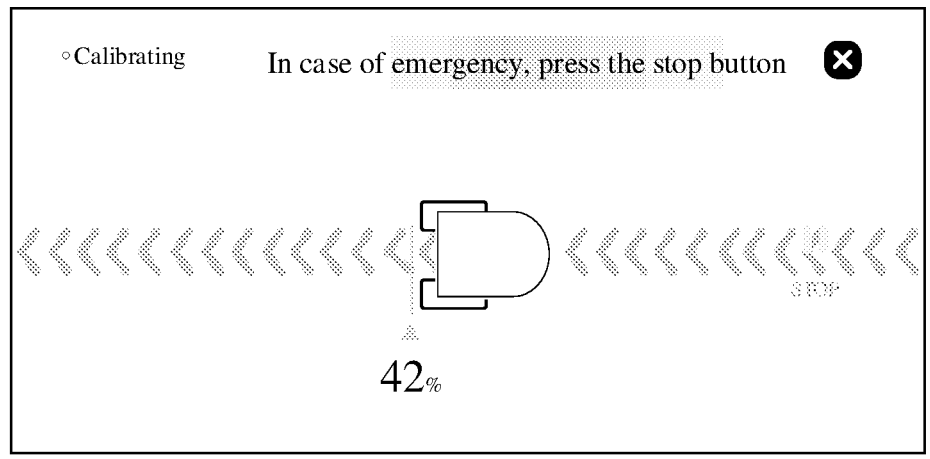
FIG. 3H is a schematic diagram of a display interface of calibration progress information.

As shown in FIG. 3H, during the calibration, the calibration progress information is acquired by communicating with the lawnmower, where the calibration progress information is determined based on the number of collected position data of the lawnmower. If a total of 26 position data needs to be collected, and 10 are currently collected, then the calibration progress is 38%. After collecting 26 position data and fitting a straight line, it may be determined that the calibration progress is 100%.

The method may display some information during the calibration of the lawnmower to the user, thereby facilitating the user to understand the calibration process and calibration results, and making it more convenient for the user to operate and use the lawnmower.

Figure 4A:
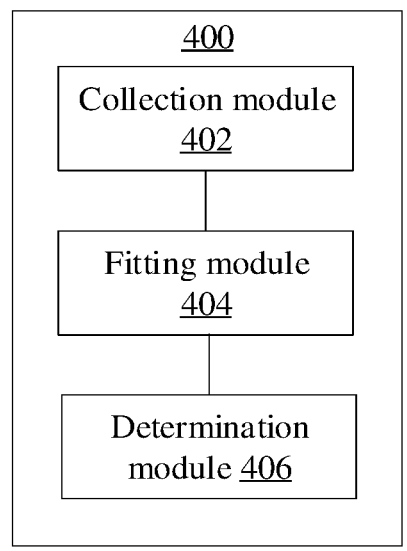
FIG. 4A is a schematic flowchart of a first apparatus for calibrating a lawnmower according to an exemplary embodiment of the present disclosure.

FIG. 4A shows a schematic diagram of an architecture of an apparatus for calibrating a lawnmower according to an exemplary embodiment of the present disclosure. As shown in the figure, the apparatus 400 for calibrating a lawnmower in this embodiment mainly includes:

A collection module 402, is configured to collect a preset number of position data during moving of the lawnmower relative to a charging station.

A fitting module 404, is configured to perform straight line fitting using the preset number of position data.

A determination module 406, is configured to determine, if the preset number of position data fits a straight line, an orientation of the charging station based on a slope of the fitted straight line.

Alternatively, the collection module 402 is further configured to: use a position where the lawnmower is in the docking state as an initialized position, and acquire initial position data corresponding to the initialized position, if it is determined that the lawnmower is in a docking state with the charging station, wherein the preset number of position data includes the initial position data.

Alternatively, the collection module 402 is further configured to: drive the lawnmower to move in a direction along a straight line away from the charging station in a pose corresponding to the initialized position, and collect the preset number of position data of the lawnmower during the movement.

Alternatively, the collection module 402 is further configured to: collect the preset number of position data during moving of the lawnmower relative to the charging station, where a rotation angle of a pose of the lawnmower at each position where the position data is collected relative to the pose of the lawnmower corresponding to the initialized position is less than an angle threshold.

Alternatively, the lawnmower is provided with an inertial measurement unit, and the collection module 402 is further configured to: drive the lawnmower to move in the direction along the straight line away from the charging station in the pose corresponding to the initialized position; acquire the position data during the movement of the lawnmower, and acquire angle data of the inertial measurement unit; determine a rotation angle of a pose of the lawnmower at a current moment relative to the pose corresponding to the initialized position based on the angle data; if the rotation angle is greater than a set angle threshold, clear the acquired position data, and re-determine the initialized position with a position at the current moment, acquire position data of the lawnmower at the current moment, and reset the inertial measurement unit; and return to the step of driving the lawnmower to move in a direction along a straight line away from the charging station in a pose corresponding to the initialized position to continue execution.

Illustratively, the lawnmower is provided with an encoder. Alternatively, the collection module 402 is further configured to: if the rotation angle is less than or equal to the set angle threshold, determine whether a distance of the position of the lawnmower at the current moment relative to the initialized position exceeds a set distance threshold based on distance data of the encoder; if the distance threshold is not exceeded, determine whether the number of the acquired position data satisfies the preset number; and if the preset number is satisfied, perform the step of performing straight line fitting using the preset number of position data.

Alternatively, the collection module 402 is further configured to: if the distance of the position of the lawnmower at the current moment relative to the initialized position exceeds the distance threshold, determine that calibration fails, and drive the lawnmower to move to the charging station to wait for a next calibration.

Alternatively, the collection module 402 is further configured to: if the number of the acquired position data does not satisfy the preset number, return to the step of acquiring the position data during the movement of the lawnmower, and acquiring angle data of the inertial measurement unit to continue execution.

Alternatively, if the fitting module 404 does not fit a straight line based on the preset number of position data, the collection module 402 is further configured to: return to the step of acquiring the position data during the movement of the lawnmower, and acquiring angle data of the inertial measurement unit to continue execution.

Alternatively, the fitting module 404 is further configured to: determine a travel direction of the lawnmower based on the slope of the fitted straight line; determine the rotation angle of the pose of the lawnmower at the current moment relative to the pose corresponding to the initialized position based on the angle data of the inertial measurement unit; and determine the orientation of the charging station based on the rotation angle and the travel direction of the lawnmower.

Embodiments of the present disclosure also provides a lawnmower, including a controller, and the controller may be configured to: collect a preset number of position data during moving of the lawnmower relative to a charging station; perform straight line fitting using the preset number of position data; and determine, if the preset number of position data fits a straight line, an orientation of the charging station based on a slope of the fitted straight line.

Embodiments of the present disclosure also provides a non-transitory computer readable storage medium, storing computer instructions thereon, the computer instructions are used to cause the computer to perform the method according to any one of the above embodiments.

An exemplary embodiment of the present disclosure also provides an electronic device, including: at least one processor; and a memory communicatively connected to the at least one processor. The memory stores a computer program capable of being executed by the at least one processor, the computer program, when executed by the at least one processor, cause the electronic device to perform the method for calibrating a lawnmower according to any one of the above embodiments.

Figure 4B:
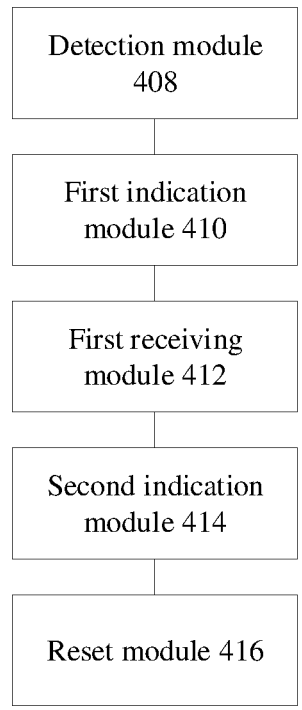
FIG. 4B is a schematic flowchart of a first apparatus for calibrating a lawnmower according to an exemplary embodiment of the present disclosure.

FIG. 4B shows a structural block diagram of an apparatus for calibrating a lawnmower according to an embodiment of the present disclosure, and the apparatus includes:

A detection module 408, configured to determine, during moving of a lawnmower relative to a charging station, an orientation of the charging station, based on a plurality of position data and pose data of the lawnmower; and a first indication module 410, configured to send first indication information for indicating successful determination, if the orientation of the charging station is determined.

Alternatively, the position data is obtained through detection by a pair of RTK antennas mounted on the lawnmower and the charging station, and the pose data is obtained through detection by an inertial measurement unit mounted on the lawnmower.

Alternatively, the apparatus further includes: a first receiving module 412, configured to receive a calibration trigger instruction sent by a display device for indicating the lawnmower to start calibration, and drive the lawnmower to move relative to the charging station based on the calibration trigger instruction, and perform the step of determining, during moving of a lawnmower relative to a charging station, an orientation of the charging station, based on a plurality of position data and pose data of the lawnmower.

Alternatively, the detection module 408 is configured to: collect, during withdrawal of the lawnmower from the charging station, a withdrawal distance of the lawnmower, the position data and the pose data of the lawnmower, respectively; and if the number of the collected position data reaches a preset number and the withdrawal distance does not exceed a set distance threshold, and a rotation angle indicated by the pose data of the lawnmower does not exceed an angle threshold, determine the orientation of the charging station based on the preset number of collected position data.

Alternatively, the detection module 408 is configured to: perform straight line fitting using the preset number of the position data, and if a straight line is fitted, determine the orientation of the charging station based on the fitted straight line.

Alternatively, the apparatus further includes:

a second indication module 414, configured to, if the withdrawal distance exceeds the distance threshold, send second indication information for indicating calibration failure; or a reset module 416, configured to, if the rotation angle indicated by the pose data exceeds the angle threshold and the withdrawal distance does not exceed the distance threshold, clear the collected position data and use a current position and a current pose as an initial position and an initial pose, return to the step corresponding to the detection module 408 to continue execution.

Figure 4C:
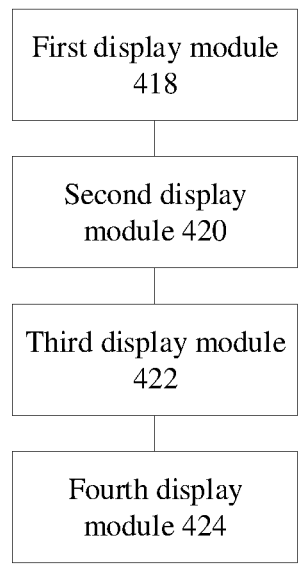
FIG. 4C is a schematic flowchart of a first apparatus for calibrating a lawnmower according to an exemplary embodiment of the present disclosure.

FIG. 4C shows a structural block diagram of an apparatus for calibrating a lawnmower according to an embodiment of the present disclosure, and the apparatus includes:

a first display module 418, configured to display a calibration option in a display interface, and send a calibration trigger instruction to the lawnmower when the calibration option is triggered;

a second display module 420, configured to display, if first indication information is received from the lawnmower in response to the calibration trigger instruction, calibration success prompt information in the display interface, where the first indication information is determined based on a successfully determined orientation of a charging station, and the orientation of the charging station is determined based on a plurality of position data and pose data during moving of the lawnmower relative to the charging station.

Alternatively, the apparatus further includes:

a third display module 422, configured to display, when a display duration of the calibration success prompt information satisfies a set duration or when a trigger operation is received on a start mapping option in the display interface of the calibration success prompt information, a remote control interface for remote control of the lawnmower for mapping in the display interface.

Alternatively, the apparatus further includes:

a fourth display module 424, configured to display calibration progress information in the display interface during the movement of the lawnmower relative to the charging station, where the calibration progress information is determined based on the number of collected position data of the lawnmower.

Figure 5:
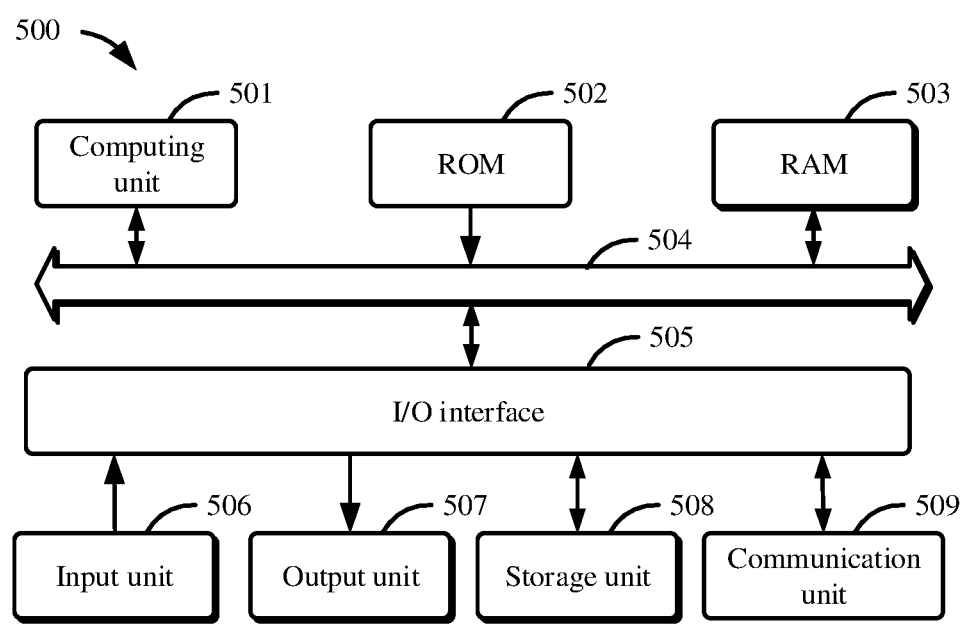
FIG. 5 is a schematic diagram of an architecture of an electronic device according to an exemplary embodiment of the present disclosure.

Referring to FIG. 5, a structural block diagram of an electronic device 500 that can serve as a server or a client of an embodiment of the present disclosure will be described, which is an example of a hardware device that can be applied to various aspects of the embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of embodiments of the present disclosure described and/or claimed herein.

As shown in FIG. 5, the electronic device 500 includes a computing unit 501, which may perform various appropriate actions and processing, based on a computer program stored in a read-only memory (ROM) 502 or a computer program loaded from a storage unit 508 into a random access memory (RAM) 503. In the RAM 503, various programs and data required for the operation of the device 500 may also be stored. The computing unit 501, the ROM 502, and the RAM 503 are connected to each other through a bus 504. An input/output (I/O) interface 505 is also connected to the bus 504.

A plurality of parts in the device 500 are connected to the I/O interface 505, including: an input unit 506, an output unit 507, the storage unit 508, and a communication unit 509. The input unit 506 may be any type of device capable of inputting information to the electronic device 500, and the input unit 506 may receive input numeric or character information, and generate key signal input related to user settings and/or function control of the electronic device. The output unit 507 may be any type of device capable of presenting information, and may include, but is not limited to, a display, a speaker, a video/audio output terminal, a vibrator, and/or a printer. The storage unit 508 may include, but is not limited to, a magnetic disk and an optical disk. The communication unit 509 allows the electronic device 500 to exchange information/data with other devices through a computer network such as the Internet and/or various telecommunication networks, and may include but not limited to a modem, a network card, an infrared communication device, a wireless communication transceiver and/or a chipset, such as Bluetooth™ devices, WiFi devices, WiMax devices, cellular communication devices, and/or the like.

The computing unit 501 may be various general-purpose and/or dedicated processing components having processing and computing capabilities. Some examples of the computing unit 501 include, but are not limited to, central processing unit (CPU), graphics processing unit (GPU), various dedicated artificial intelligence (AI) computing chips, various computing units running machine learning model algorithms, digital signal processors (DSP), and any appropriate processors, controllers, microcontrollers, etc. The computing unit 501 performs the various methods and processes described above. For example, in some embodiments, the method for calibrating a lawnmower may be implemented as a computer software program, which is tangibly included in a machine readable medium, such as the storage unit 508. In some embodiments, part or all of the computer program may be loaded and/or installed on the electronic device 500 via the ROM 502 and/or the communication unit 509. In some embodiments, the computing unit 501 may be configured to perform the above method for calibrating a lawnmower by any other appropriate means (for example, by means of firmware).

Program codes used to implement the method of embodiments of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of embodiments of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

As used herein, the terms "machine-readable medium" and "computer-readable medium" refer to any computer program product, device, and/or apparatus (e.g., magnetic disk, optical disk, memory, programmable logic device (PLD)) for providing machine instructions and/or data to a programmable processor, including machine-readable medium that receive machine instructions as machine-readable signals. The term "machine-readable signal" refers to any signal used to provide machine instructions and/or data to a programmable processor.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other.

It should be noted that, according to the needs of implementation, each component/step described in the embodiments of the present disclosure may be divided into more components/steps, and two or more components/steps or partial operations of components/steps may also be combined into new components/steps to achieve the purpose of the embodiments of the present disclosure.

Those of ordinary skill in the art may appreciate that the units and method steps of the examples described in conjunction with the embodiments disclosed herein can be implemented by electronic hardware, or a combination of computer software and electronic hardware. Whether these functions are executed by hardware or software depends on the particular application and design constraints of the technical solution. Those skilled in the art may use different methods to implement the described functions for each particular application, but such implementation should not be regarded as exceeding the scope of the embodiments of the present disclosure.

To sum up, the method for calibrating a lawnmower provided in the embodiments of the present disclosure, accurately determine the orientation of the charging station by collecting measurement data during the movement of the lawnmower relative to the charging station and performing straight line fitting based on the measurement data, have the advantages of simple calibration operation, easy to implement, low calibration cost, or the like.

Furthermore, the lawnmower calibration processing of embodiments of the present disclosure uses fewer sensors, and may determine the travel direction information of the lawnmower under the condition of configuring a single RTK antenna, and does not need complicated manual operations, which can not only effectively reduce the cost of calibration and travel direction calculation of the lawnmower, but also has high calibration efficiency.

The above implementations are only used to illustrate the embodiments of the present disclosure, rather than to limit the embodiments of the present disclosure. Those of ordinary skill in the relevant technical fields can also make various changes and modifications without departing from the spirit and scope of the embodiments of the present disclosure, so that all equivalent technical solutions also belong to the category of the embodiments of the present disclosure, and the patent protection scope of the embodiments of the present disclosure should be defined by the claims.

What is claimed is:

1. A method for calibrating a lawnmower, the method comprising:
collecting, by a pair of Real Time Kinematic (RTK) antennas respectively set at a preset position and on the lawnmower, a preset number of position data of the lawnmower during moving of the lawnmower relative to a charging station;
performing straight line fitting using the preset number of the position data; and
determining, when the preset number of the position data fits a straight line, an orientation of the charging station based on a slope of the fitted straight line.

2. The method for calibrating the lawnmower according to claim 1, the collecting the preset number of the position data during moving of the lawnmower relative to the charging station, comprises:
when it is determined that the lawnmower is in a docking state with the charging station, using a position where the lawnmower is in the docking state as an initialized position, and acquiring initial position data corresponding to the initialized position, wherein the preset number of the position data comprises the initial position data.

3. The method for calibrating the lawnmower according to claim 2, wherein the collecting the preset number of the position data during moving of the lawnmower relative to the charging station, further comprises:
driving the lawnmower to move in a direction along a straight line away from the charging station in a pose corresponding to the initialized position, and collecting the preset number of the position data of the lawnmower during the movement; or
collecting the preset number of the position data during moving of the lawnmower relative to the charging station, wherein a rotation angle of a pose of the lawnmower at each position where the position data is collected relative to the pose of the lawnmower corresponding to the initialized position is less than a set angle threshold.

4. The method for calibrating the lawnmower according to claim 3, the lawnmower is provided with an inertial measurement unit;
the driving the lawnmower to move in the direction along the straight line away from the charging station in the pose corresponding to the initialized position, and collecting the preset number of the position data of the lawnmower during the movement, comprises:
driving the lawnmower to move in the direction along the straight line away from the charging station in the pose corresponding to the initialized position;
acquiring the position data during the movement of the lawnmower, and acquiring angle data of the inertial measurement unit;
determining a rotation angle of a pose of the lawnmower at a current moment relative to the pose corresponding to the initialized position based on the angle data;
when the rotation angle is greater than the set angle threshold, clearing the acquired position data, and re-determining the initialized position with a position at the current moment, acquiring the position data of the lawnmower at the current moment, and resetting the inertial measurement unit; and
returning to the step of driving the lawnmower to move in the direction along the straight line away from the charging station in the pose corresponding to the initialized position to continue execution.

5. The method for calibrating the lawnmower according to claim 4, wherein the lawnmower is provided with an encoder;
the driving the lawnmower to move in the direction along the straight line away from the charging station in the pose corresponding to the initialized position, and collecting the preset number of the position data of the lawnmower during the movement, further comprises:
when the rotation angle is less than or equal to the set angle threshold, determining whether a distance of the position of the lawnmower at the current moment relative to the initialized position exceeds a set distance threshold based on distance data of the encoder;
when the distance threshold is not exceeded, determining whether a number of the acquired position data satisfies the preset number; and
when the preset number is satisfied, performing the step of performing straight line fitting using the preset number of the position data.

6. The method for calibrating the lawnmower according to claim 5, wherein,
the driving the lawnmower to move in the direction along the straight line away from the charging station in the pose corresponding to the initialized position, and collecting the preset number of the position data of the lawnmower during the movement, further comprises:
when the distance of the position of the lawnmower at the current moment relative to the initialized position exceeds the distance threshold, determining that calibration fails, and driving the lawnmower to move to the charging station to wait for a next calibration;
the driving the lawnmower to move in the direction along the straight line away from the charging station in the pose corresponding to the initialized position, and collecting the preset number of the position data of the lawnmower during the movement, further comprises:
when the number of the acquired position data does not satisfy the preset number, returning to the step of acquiring the position data during the movement of the lawnmower, and acquiring the angle data of the inertial measurement unit to continue execution; or
after the performing straight line fitting using the preset number of the position data, the method further comprises: when the preset number of the position data does not fit the straight line, returning to the step of acquiring the position data during the movement of the lawnmower, and acquiring the angle data of the inertial measurement unit to continue execution.

7. The method for calibrating the lawnmower according to claim 1, the determining, when the preset number of the position data fits the straight line, the orientation of the charging station based on the slope of the fitted straight line, comprises:
determining a travel direction of the lawnmower based on the slope of the fitted straight line;
determining the rotation angle of the pose of the lawnmower at the current moment relative to the pose corresponding to the initialized position based on the angle data of the inertial measurement unit; and
determining the orientation of the charging station based on the rotation angle and the travel direction of the lawnmower.

8. A method for calibrating a lawnmower, the method comprising:
determining, during moving of the lawnmower relative to a charging station, an orientation of the charging station, based on a plurality of position data and pose data of the lawnmower, wherein the plurality of position data is collected by a pair of Real Time Kinematic (RTK) antennas respectively set at a preset position and on the lawnmower;

performing straight line fitting using the plurality of position data;

determining, when the plurality of position data fits a straight line, an orientation of the charging station based on a slope of the fitted straight line; and sending first indication information for indicating successful determination, when the orientation of the charging station is determined.

9. The method for calibrating the lawnmower according to claim 8, the plurality of position data is obtained through detection by the pair of Real Time Kinematic (RTK) antennas respectively mounted on the lawnmower and the charging station, and the pose data is obtained through detection by an inertial measurement unit mounted on the lawnmower.

10. The method for calibrating the lawnmower according to claim 9, wherein, receiving a calibration trigger instruction sent by a display device for indicating the lawnmower to start calibration, and driving the lawnmower to move relative to the charging station based on the calibration trigger instruction, and performing the step of determining, during moving of the lawnmower relative to the charging station, the orientation of the charging station, based on the plurality of position data and pose data of the lawnmower.

11. The method for calibrating the lawnmower according to claim 10, the determining, during moving of the lawnmower relative to the charging station, the orientation of the charging station, based on the plurality of position data and pose data of the lawnmower, comprises:

collecting, during withdrawal of the lawnmower from the charging station, a withdrawal distance of the lawnmower, the position data and the pose data of the lawnmower, respectively; and when a number of the position data collected reaches a preset number and the withdrawal distance does not exceed a set distance threshold, and a rotation angle indicated by the pose data of the lawnmower does not exceed an angle threshold, determining the orientation of the charging station based on the preset number of the position data collected.

12. The method for calibrating the lawnmower according to claim 11, the method further comprises:

when the withdrawal distance exceeds the distance threshold, sending second indication information for indicating calibration failure; or when the rotation angle indicated by the pose data exceeds the angle threshold and the withdrawal distance does not exceed the distance threshold, clearing the position data collected and using a current position and a current pose as an initial position and an initial pose, returning to the step of determining, during moving of the lawnmower relative to the charging station, the orientation of the charging station, based on the plurality of position data and pose data of the lawnmower to continue execution.

13. A lawnmower, comprising a controller, wherein the controller is configured to perform the method according to claim 8.

14. An electronic device, comprising:

a processor; and a memory, for storing a program;

wherein, the program comprises instructions, the instructions, when executed by the processor, cause the processor to perform the method according to claim 8.

15. A method for calibrating a lawnmower, the method comprising:

displaying, by a display interface of a device, a calibration option, and sending a calibration trigger instruction to the lawnmower when the calibration option is triggered by a user; and displaying, when first indication information is received from the lawnmower in response to the calibration trigger instruction, calibration success prompt information by the display interface, wherein the first indication information is determined based on a successfully determined orientation of a charging station, and the orientation of the charging station is determined based on a plurality of position data and pose data during moving of the lawnmower relative to the charging station.

16. The method for calibrating the lawnmower according to claim 15, the method further comprises:

displaying, when a display duration of the calibration success prompt information satisfies a set duration or when a trigger operation is received on a start mapping option by the display interface of the calibration success prompt information, a remote control interface for remote control of the lawnmower for mapping by the display interface.

17. The method for calibrating the lawnmower according to claim 15, the method further comprises:

displaying calibration progress information by the display interface during the movement of the lawnmower relative to the charging station, wherein the calibration progress information is determined based on a number of collected position data of the lawnmower.

18. An electronic device, comprising:

a processor; and a memory, for storing a program;

wherein, the program comprises instructions, the instructions, when executed by the processor, cause the processor to perform the method according to claim 15.

19. A non-transitory computer readable storage medium, storing computer instructions thereon, wherein, the computer instructions are used to cause the computer to perform the method according to claim 15.

* * * * *